United States Patent
Hibben et al.

(10) Patent No.: US 10,858,532 B2
(45) Date of Patent: *Dec. 8, 2020

(54) COATING COMPOSITIONS FOR POLYMERIC ROOFING MATERIALS

(71) Applicant: SWIMC LLC, Cleveland, OH (US)

(72) Inventors: Mary Jane Hibben, Elburn, IL (US); Allen Bulick, Bolingbrook, IL (US); Brent Crenshaw, Woodstock, IL (US); Ashley Rodgers, Rockford, IL (US); Glenn Frazee, Twin Lakes, WI (US); Robert Sandoval, Crystal Lake, IL (US)

(73) Assignee: SWIMC LLC, Cleveland, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/383,359

(22) Filed: Apr. 12, 2019

(65) Prior Publication Data

US 2019/0315995 A1   Oct. 17, 2019

Related U.S. Application Data

(60) Provisional application No. 62/657,530, filed on Apr. 13, 2018.

(51) Int. Cl.
| | | |
|---|---|---|
| *C09D 133/08* | (2006.01) | |
| *C08L 23/16* | (2006.01) | |
| *C08L 27/06* | (2006.01) | |
| *C09D 133/10* | (2006.01) | |
| *E04D 5/06* | (2006.01) | |
| *C08F 2/38* | (2006.01) | |
| *C08K 5/37* | (2006.01) | |

(52) U.S. Cl.
CPC ............ *C09D 133/08* (2013.01); *C08L 23/16* (2013.01); *C08L 27/06* (2013.01); *C09D 133/10* (2013.01); *E04D 5/06* (2013.01); *C08F 2/38* (2013.01); *C08K 5/37* (2013.01)

(58) Field of Classification Search
CPC .. C09J 133/066; C09J 133/062; C08F 220/18; C08F 2220/1825; C08F 2220/1841; C08F 2800/20; E04D 7/00; E04D 11/02
USPC ........................................................ 524/506
See application file for complete search history.

(56) References Cited

U.S. PATENT DOCUMENTS

| | | |
|---|---|---|
| 4,897,137 A | 1/1990 | Miller et al. |
| 4,997,882 A | 3/1991 | Martz et al. |
| 5,234,987 A | 8/1993 | Hubbard et al. |
| 5,849,133 A | 12/1998 | Senderling et al. |
| 6,060,532 A | 5/2000 | Frankel et al. |
| 6,084,024 A * | 7/2000 | Mao ............ C08F 218/10 524/556 |
| 6,107,382 A | 8/2000 | Williams et al. |
| 6,297,312 B1 | 10/2001 | Wang |
| 6,300,414 B1 | 10/2001 | McGee et al. |
| 6,391,461 B1 | 5/2002 | Ryntz et al. |
| 6,479,163 B2 | 11/2002 | Kawano et al. |
| 6,762,230 B2 | 7/2004 | Bradenburger et al. |
| 6,825,278 B2 | 11/2004 | Holub et al. |
| 6,841,619 B2 | 1/2005 | McGee et al. |
| 6,939,916 B2 | 9/2005 | Merritt et al. |
| 7,279,541 B2 | 10/2007 | Centner et al. |
| 7,368,155 B2 | 5/2008 | Larson et al. |
| 7,641,964 B2 | 1/2010 | Swei et al. |
| 7,803,867 B2 | 9/2010 | Hanrahan et al. |
| 7,816,449 B2 | 10/2010 | Menovcik et al. |
| 8,063,141 B2 | 11/2011 | Fisher |
| 8,084,527 B2 | 12/2011 | Paschkowski et al. |
| 8,202,932 B2 | 6/2012 | Kneafsey et al. |
| 8,435,639 B2 | 5/2013 | Rokowski et al. |
| 8,448,408 B2 | 5/2013 | Kalwara |
| 8,713,879 B2 | 5/2014 | Wiercinski et al. |
| 8,993,667 B2 | 3/2015 | Rokowski et al. |
| 9,193,880 B2 | 11/2015 | Allam et al. |
| 9,528,268 B2 | 12/2016 | Hubbard |
| 9,688,872 B2 | 6/2017 | Power et al. |
| 10,208,148 B2 | 2/2019 | Corten et al. |
| 2004/0102568 A1 | 5/2004 | Bridgewater et al. |
| 2006/0100357 A1 | 5/2006 | Bunn et al. |

(Continued)

FOREIGN PATENT DOCUMENTS

| | | |
|---|---|---|
| EP | 0977806 A1 | 2/2000 |
| EP | 0982353 A1 | 3/2000 |

(Continued)

OTHER PUBLICATIONS

U.S. Appl. No. 16/383,398, filed Apr. 12, 2019, naming inventors Bulick et al.

(Continued)

*Primary Examiner* — Hui H Chin
(74) *Attorney, Agent, or Firm* — Shumaker & Sieffert, P.A.

(57) ABSTRACT

A latex emulsion may include an aqueous carrier liquid and a latex copolymer formed from reactants comprising butyl methacrylate, wherein the reactants include at least 20 wt. % butyl methacrylate, based on the total weight of ethylenically unsaturated monomers used to make the latex copolymer. A coating formed from the latex emulsion exhibits a wet adhesion to a thermoplastic polyolefin roofing membrane of greater than about 1 pound per linear inch when tested using fabric embedded peel adhesion testing per ASTM C794. The latex emulsion may be used as part of an aqueous coating composition or a roofing system including a polymeric roofing membrane.

19 Claims, No Drawings

(56) References Cited

U.S. PATENT DOCUMENTS

| | | |
|---|---|---|
| 2009/0035587 A1* | 2/2009 | Killilea ............... C08F 220/18 |
| | | 428/447 |
| 2010/0326598 A1 | 12/2010 | Atwater |
| 2011/0275748 A1 | 11/2011 | Griffith et al. |
| 2014/0235780 A1* | 8/2014 | Rokowski ............... E04D 1/20 |
| | | 524/432 |
| 2014/0377576 A1 | 12/2014 | Batra et al. |
| 2016/0108296 A1 | 4/2016 | Tang |
| 2016/0312471 A1 | 10/2016 | Hubbard et al. |
| 2016/0369122 A1 | 12/2016 | Rokowski et al. |

FOREIGN PATENT DOCUMENTS

| | | |
|---|---|---|
| EP | 2778195 A1 | 2/2014 |
| WO | 9850465 | 11/1998 |
| WO | 2015130729 A1 | 9/2015 |
| WO | 2017091490 A1 | 6/2017 |
| WO | 2019043024 A1 | 3/2019 |
| WO | 2019097041 A1 | 5/2019 |

OTHER PUBLICATIONS

International Search Report and Written Opinion of International Application No. PCT/US2019/027352, dated Aug. 5, 2019, 16 pp.

Zhang et al., "Catechol-Functionalized Latex Polymers Display Improved Adhesion to Low-Surface-Energy Thermoplastic Polyolefin Substrates," Applied Polymer Materials, published May 10, 2019, 9 pp.

Office Action from U.S. Appl. No. 16/383,398, dated Sep. 19, 2019, 8 pp.

Response to Office Action dated Sep. 19, 2019, from U.S. Appl. No. 16/383,398, filed Dec. 19, 2019, 9 pp.

Office Action dated Mar. 19, 2020, from U.S. Appl. No. 16/383,398, 7 pp.

Response to Office Action from U.S. Appl. No. 16/383,398, filed Jul. 17, 2020, 10 pp.

Notice of Allowance from U.S. Appl. No. 16/383,398, dated Sep. 4, 2020, 2 pp.

Notice of Allowance from U.S. Appl. No. 16/383,398, dated Aug. 12, 2020, 8 pp.

* cited by examiner

2

COATING COMPOSITIONS FOR POLYMERIC ROOFING MATERIALS

PRIORITY CLAIM

This application claims the benefit of U.S. Application No. 62/657,530, filed Apr. 13, 2018, the contents of which are hereby incorporated by reference in their entirety.

BACKGROUND

Polymeric membranes, such as, for example, thermoplastic polyolefin (TPO) membranes, ethylene propylene diene monomer (EPDM) rubber membranes, and poly(vinyl chloride) (PVC) membranes, are widely used as coverings for roof surfaces of buildings. TPO, EPDM rubber, and PVC membranes may be installed as white, single-ply membranes to provide a solar reflective surface which saves money on energy costs related to cooling the building. TPO, EPDM rubber, and PVC membranes may be coated, such as to extend the life of a new TPO, EPDM, or PVC rubber membrane or to repair damaged or worn areas of aged TPO, EPDM rubber, or PVC membranes.

As TPO membranes age, the exposed surface of the membranes oxidizes, which may improve adhesion of coatings to the membrane. However, membranes weather differently in different climates and may weather unevenly, e.g., due to uneven exposure to the elements.

Coatings currently used for polymeric roofing membranes are based on two-component epoxies, which may include high volatile organic content (VOC), relatively high cost, relatively short potlife, and relatively difficult handling due to the requirement of mixing the two components prior to coating application. In many implementations, the epoxy coating is used as a base layer or primer and topcoated with a flexible acrylic or silicone coating.

SUMMARY

In some examples, the disclosure describes a latex emulsion including an aqueous carrier liquid and a latex copolymer formed from reactants comprising butyl methacrylate, 2-ethylhexyl methacrylate, VeoVa™ 10, or combinations thereof, wherein the reactants include at least 20 weight percent (wt. %) of the butyl methacrylate, 2-ethylhexyl methacrylate, VeoVa™ 10, or combinations thereof, based on the total weight of ethylenically unsaturated monomers used to make the latex copolymer. A coating formed from the latex emulsion optionally and preferably exhibits a wet adhesion to a thermoplastic polyolefin roofing membrane of greater than about 1 pound per linear inch (about 0.1785 kilograms per linear centimeter) when tested using fabric embedded peel adhesion testing per ASTM C794 at a coat weight of about 80 ft²/gal.

In some examples, the disclosure describes an aqueous roof coating composition including an aqueous carrier liquid; a dispersant, a biocide, a fungicide, an UV stabilizer, a thickener, a wetting agent, a defoamer, a filler, a pigment or colorant, or combinations thereof; and a latex copolymer formed from reactants comprising a vinyl monomer having an alkyl group including between 2 and 20 carbon atoms, wherein the reactants comprise at least 20 wt. % of the vinyl monomer having an alkyl group including between 2 and 12 carbon atoms, based on the total weight of ethylenically unsaturated monomers used to make the latex copolymer, and wherein a homopolymer formed from the vinyl monomer exhibits a glass transition temperature of between about −10° C. and about 30° C. A coating formed from the coating composition optionally and preferably exhibits a wet adhesion to a thermoplastic polyolefin roofing membrane of greater than about 1 pounds per linear inch (about 0.1785 kilograms per linear centimeter) when tested using fabric embedded peel adhesion testing per ASTM C794 at a coverage of about 80 ft²/gallon.

In some examples, the disclosure describes a method including reacting reactants including a vinyl monomer having an alkyl group including between 2 and 20 carbon atoms to form a latex emulsion including a latex copolymer, wherein the reactants comprise at least 20 wt. % of the vinyl monomer having an alkyl group including between 2 and 20 carbon atoms, based on the total weight of ethylenically unsaturated monomers used to make the latex copolymer, wherein a homopolymer formed from the vinyl monomer exhibits a glass transition temperature of between about −10° C. and about 30° C., and wherein a coating formed from the latex emulsion optionally and preferably exhibits a wet adhesion to a thermoplastic polyolefin roofing membrane of greater than about 1 pound per linear inch (about 0.1785 kilograms per linear centimeter) when tested using fabric embedded peel adhesion testing per ASTM C794 at a coverage of about 80 ft²/gallon.

In some examples, the disclosure describes a roofing product that includes a polymeric roofing membrane and a coating on a surface of the polymeric roofing membrane. The coating may be formed from any of the latex emulsions described herein.

In some examples, the disclosure describes a roofing product that includes a polymeric roofing membrane and a coating on a surface of the polymeric roofing membrane. The coating may be formed from any of the aqueous roof coating compositions described herein.

In some examples, the disclosure describes a method including coating a polymeric roofing membrane with a coating formed from a latex emulsion including an aqueous carrier liquid and a latex copolymer formed from reactants comprising butyl methacrylate, 2-ethylhexyl methacrylate, VeoVa™ 10, or combinations thereof, wherein the reactants include at least 20 wt. % of the butyl methacrylate, 2-ethylhexyl methacrylate, VeoVa™ 10, or combinations thereof, based on the total weight of ethylenically unsaturated monomers used to make the latex copolymer. The coating optionally and preferably exhibits a wet adhesion to a thermoplastic polyolefin roofing membrane of greater than about 1 pound per linear inch (about 0.1785 kilograms per linear centimeter) when tested using fabric embedded peel adhesion testing per ASTM C794 at a coverage of about 80 ft²/gallon.

In some examples, the disclosure describes a method including coating a polymeric roofing membrane with a coating formed from an aqueous roof coating composition including an aqueous carrier liquid; a dispersant, a biocide, a fungicide, an UV stabilizer, a thickener, a wetting agent, a defoamer, a filler, a pigment or colorant, or combinations thereof; and a latex copolymer formed from reactants comprising a vinyl monomer having an alkyl group including between 2 and 20 carbon atoms, wherein the reactants comprise at least 20 wt. % of the vinyl monomer having an alkyl group including between 2 and 20 carbon atoms, based on the total weight of ethylenically unsaturated monomers used to make the latex copolymer, and wherein a homopolymer formed from the vinyl monomer exhibits a glass transition temperature of between about −10° C. and about 30° C. A coating formed from the coating composition optionally and preferably exhibits a wet adhesion to a thermoplastic polyolefin roofing membrane of greater than about 1 pounds per linear inch (about 0.1785 kilograms per linear centimeter) when tested using fabric embedded peel adhesion testing per ASTM C794 at a coverage of about 80 ft²/gallon.

The details of one or more examples are set forth in the accompanying drawings and the description below. Other features, objects, and advantages of the disclosure will be apparent from the description and drawings, and from the claims.

DETAILED DESCRIPTION

A "latex" polymer means a dispersion or emulsion of polymer particles formed in the presence of water and one or more dispersing or emulsifying agents (e.g., a surfactant, alkali-soluble polymer, or mixtures thereof) whose presence is required to form the dispersion or emulsion. The dispersing or emulsifying agent is typically separate from the polymer after polymer formation. In some examples, a reactive dispersing or emulsifying agent may become part of the polymer particles as they are formed.

The recitation of a numerical range using endpoints includes all numbers subsumed within that range (e.g., 1 to 5 includes 1, 1.5, 2, 2.75, 3, 3.80, 4, 5, etc.).

The terms "a," "an," "the," "at least one," and "one or more" are used interchangeably. Thus, for example, a coating composition that contains "an" additive means that the coating composition includes "one or more" additives.

The phrase "low VOC" when used with respect to a liquid coating composition means that the liquid coating composition contains less than about 150 grams VOC per L composition, excluding water weight (g VOC/L composition; about 15% w/v) by U.S.A. EPA Method 24, preferably not more than about 100 g VOC/L composition (about 10% w/v), more preferably not more than about 50 g VOC/L composition (about 5% w/v), and most preferably less than 20 g VOC/L composition (about 2% w/v), for example not more than about 10 g VOC/L composition (about 1% w/v) or not more than about 8 g VOC/L composition (about 0.8% w/v) volatile organic compounds.

The term "(meth)acrylic acid" includes either or both of acrylic acid and methacrylic acid, and the term "(meth)acrylate" includes either or both of an acrylate and a methacrylate.

The terms "topcoat" or "final topcoat" refer to a coating composition which when dried or otherwise hardened provides a decorative or protective outermost finish layer on a substrate, for example, a polymeric membrane attached to a building exterior (e.g., a roof). By way of further explanation, such final topcoats include paints, stains or sealers capable of withstanding extended outdoor exposure (e.g., exposure equivalent to one year of vertical south-facing Florida sunlight) without visually objectionable deterioration, but do not include primers that would not withstand extended outdoor exposure if left uncoated with a topcoat.

The present disclosure describes latex emulsions and aqueous coating compositions including latex emulsions that have relatively high wet adhesion to polymeric roofing membranes, such as TPO membranes, EPDM rubber membranes, or PVC membranes. The latex emulsions and aqueous coating compositions may be used as primer coats or topcoats on polymeric roofing membranes. The latex emulsion includes an aqueous carrier liquid and a latex copolymer preferably formed from reactants that include a vinyl monomer having an alkyl group including at least 2 carbon atoms, such as at least 3 carbon atoms, or at least 4 carbon atoms. Typically, the alkyl group including at least 2 carbons has less than 20 carbons, less than 15 carbons, or less than 12 carbons. In some examples, the vinyl monomer may include an alkyl group that includes between 2 and 20 carbon atoms. The vinyl monomer may optionally and preferably include

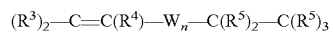

wherein $R^3$ is independently selected from hydrogen or an organic group (typically at least one and more typically both $R^3$ are hydrogen atoms); $R^4$ is selected from hydrogen or an alkyl group (e.g., a methyl group); W, if present, is a divalent linking group (e.g., an ester bond of either directionality: —C(C=O)— or —(C=O)C—); n is 0 or 1, more typically 1; and each $R^5$ is independently hydrogen, a linear alkyl group, or a branched alkyl group. A homopolymer formed from the vinyl monomer preferably exhibits a glass transition temperature between about −10° C. and about 30° C., or between about −7° C. and about 25° C., or between about −7° C. and about 20° C. For example, the glass transition temperature of n-butyl methacrylate is about 20° C., the glass transition temperature of VeoVa™ 10 is about −3° C., and the glass transition temperature of 2-ethylhexyl methacrylate is about −6° C.

The value of the glass transition temperature is based on literature values. Typically, there is some variation of the glass transition temperature values of the homopolymers of monomers listed in such literature. For example, the glass transition temperature of the homopolymer of 2-ethyl hexyl acrylate has various literature values from −55° C. to −85° C. The difference arises from the test method used to measure the glass transition temperature. For the purposes of this disclosure, the values used for the homopolymer glass transition temperature of certain monomers, particularly monomers used in the examples, are listed herein. Alternatively, the method of determining the glass transition temperature of a homopolymer can be determined using the DSC procedure described herein, particularly if the literature values are significantly different (e.g., the literature values vary by at least 15° C.).

In some examples, the alkyl group may include one or more heteroatoms. In other examples, the alkyl group is unsubstituted. The alkyl group may include or consist of a cycloalkyl, or, in some preferred examples, may exclude a cycloalkyl group.

In some examples, the vinyl monomer having an alkyl group including between 2 and 20 carbon atoms may include laurel methacrylate, n-butyl methacrylate, iso-butyl methacrylate, t-butyl methacrylate, sec-butyl methacrylate, 2-ethylhexyl methacrylate, VeoVa™ 10, or combinations thereof. VeoVa™ 10 is a monomer available from HEXION™ Inc., Columbus, Ohio, and is a vinyl ester of neodecanoic acid, a synthetic saturated monocarboxylic acid with a highly branched structure containing ten carbon atoms. VeoVa™ 10 is represented by the formula: —CH$_2$=CH$_2$—O—(C=O)—C(R$^1$)(R$^2$)CH$_3$, where R$^1$ and R$^2$ are alkyl groups containing a total of 7 carbon atoms. In some examples, the vinyl monomer having an alkyl group including between 2 and 20 carbon atoms consists of n-butyl methacrylate or a mixture of n-butyl methacrylate and 2-ethylhexyl methacrylate.

The latex emulsion may be used to coat a substrate, such as a polymeric roofing membrane including TPO, EPDM rubber, PVC, or the like, or may be used in combination with one or more additives, such as a dispersant, a biocide, a fungicide, an UV stabilizer, a thickener, a wetting agent, a defoamer, a filler, a pigment or colorant, or combinations thereof, to form an aqueous coating composition that is used to coat a substrate. The latex emulsion or aqueous coating composition may be used to form coatings directly on polymeric roofing membranes. The coatings preferably exhibit desirable wet adhesion, e.g., a wet adhesion to virgin TPO of greater than about 1 pound per linear inch when tested using fabric embedded peel adhesion testing per ASTM C794 at a coverage of about 80 ft$^2$/gallon. In some examples, the coatings formed on virgin TPO using the latex emulsion or aqueous coating composition preferably exhibits a wet adhesion of greater than 1 pound per linear inch (about 0.1785 kilograms per linear centimeter), greater than about 2 pounds per linear inch (about 0.357 kilograms per linear centimeter) or greater than about 4 pounds per linear inch (about 0.714 kilograms per linear centimeter) when tested using fabric embedded peel adhesion testing per ASTM C794 at a coverage of about 80 ft$^2$/gallon. As used herein, virgin TPO is a TPO membrane that has not been subjected to aging induced by environmental factors such as UV light.

In this way, the latex emulsions and aqueous coating compositions including the latex emulsion may be used as a primer coat or a topcoat for polymeric roofing membranes, such as TPO membrane roofing panels, EPDM rubber membrane roofing panels, or PVC membrane roofing panels. The latex emulsions and aqueous coating compositions may provide one or more benefits compared to two-component epoxies, such as lower volatile organic content (VOC), lower cost, relatively longer potlife, or relatively easier handling due to single component nature of the latex emulsions and aqueous coating compositions. The latex emulsions and aqueous coating compositions may be used to repair polymeric roofing membranes and extend a useful life of the polymeric roofing membranes, coat polymeric roofing membranes to reduce aging and extend a useful life of the polymeric roofing membranes, coat polymeric roofing membranes to modify appearance of polymeric roofing membranes, or the like.

The latex emulsions include an aqueous carrier liquid and a latex copolymer. In some examples, the latex copolymer is an emulsion polymerized latex copolymer. The reactants that form the latex copolymer may include a vinyl monomer having an alkyl group including between 2 and 20 carbon atoms, preferably between 3 and 15 carbon atoms, more preferably between 2 and 12 carbon atoms. The vinyl monomer may include any monomer consistent with the definition and examples presented above. In some examples, the vinyl monomer includes a methacrylate. As used herein, a methacrylate having an alkyl group including between X and Y carbon atoms (e.g., between 2 and 20 carbon atoms) refers to a methacrylate having the following formula, where the $R_2$ group is the alkyl group including between X and Y carbon atoms and $R_1$ is a methyl group: $H_2C=C(R_1)C(=O)OR_2$. The alkyl group may include a linear alkyl group, a branched alkyl group, a cycloalkyl group, or an unsaturated alkyl group. In some examples, the alkyl group may exclude a cycloalkyl group. For example, the methacrylate may include or consist of laurel methacrylate, n-butyl methacrylate, iso-butyl methacrylate, t-butyl methacrylate, sec-butyl methacrylate, 2-ethylhexyl methacrylate, or the like, or combinations thereof. In some examples, the methacrylate includes or consists of n-butyl methacrylate or a mixture of n-butyl methacrylate and 2-ethylhexyl methacrylate.

The reactants used to form the latex copolymer may include at least 20 wt. % of the vinyl monomer having an alkyl group including between 2 and 20 carbon atoms, based on the total weight of ethylenically unsaturated monomers used to make the latex copolymer. As used herein, "based on the total weight of ethylenically unsaturated monomers used to make the latex copolymer" refers to a basis of the total amount of monomer used to form the latex copolymer. In some examples, the reactants include at least about 25 wt. % of the vinyl monomer having an alkyl group including between 2 and 20 carbon atoms, based on the total weight of ethylenically unsaturated monomers used to make the latex copolymer; or at least about 30 wt. % of the vinyl monomer having an alkyl group including between 2 and 20 carbon atoms, based on the total weight of ethylenically unsaturated monomers used to make the latex copolymer; or at least about 50 wt. % of the vinyl monomer having an alkyl group including between 2 and 20 carbon atoms, based on the total weight of ethylenically unsaturated monomers used to make the latex copolymer. In some examples, the reactants used to form the latex copolymer may include less than about 99 wt. % of the vinyl monomer having an alkyl group including between 2 and 20 carbon atoms, based on the total weight of ethylenically unsaturated monomers used to make the latex copolymer; or less than about 75 wt. % of the vinyl monomer having an alkyl group including between 2 and 20 carbon atoms, based on the total weight of ethylenically unsaturated monomers used to make the latex copolymer; or less than about 60 wt. % of the vinyl monomer having an alkyl group including between 2 and 20 carbon atoms, based on the total weight of ethylenically unsaturated monomers used to make the latex copolymer; or less than about 55 wt. % of the vinyl monomer having an alkyl group including between 2 and 20 carbon atoms, based on the total weight of ethylenically unsaturated monomers used to make the latex copolymer. In some examples, the latex copolymer includes between about 20 and about 55 wt. % of the vinyl monomer having an alkyl group including between 2 and 20 carbon atoms, based on the total weight of ethylenically unsaturated monomers used to make the latex copolymer.

In some examples, the reactants that form the latex copolymer also include an ethylenically unsaturated polar component. For example, the ethylenically unsaturated polar component may include an ethylenically unsaturated monomer including at least one alcohol group, an ethylenically unsaturated ionic monomer, an at least partially neutralized ethylenically unsaturated ionic monomer, or the like. The at least partially neutralized ethylenically unsaturated ionic monomer may be a salt form of the ethylenically unsaturated ionic monomer, and the salt form may be formed prior to, during, or after reaction of the ethylenically unsaturated ionic monomer with the other monomers in the reactants to form the latex copolymer.

In some examples, the ethylenically unsaturated polar monomer may include an acid- or anhydride-functional ethylenically unsaturated monomer or an at least partially neutralized acid- or anhydride-functional ethylenically unsaturated monomer. For example, the ethylenically unsaturated polar monomer may include acrylic acid, methacrylic acid, crotonic acid, fumaric acid, maleic acid, 2-methyl maleic acid, itaconic acid, 2-methyl itaconic acid, anhydride variants thereof, at least partially neutralized variants thereof, or combinations thereof.

The reactants used to form the latex copolymer may include at least about 0.1 wt. % of the ethylenically unsaturated polar monomer, based on the total weight of all reactants covalently bound in the latex copolymer. In some examples, the reactants include greater than about 0.1 wt. % of the ethylenically unsaturated polar monomer, based on the total weight of ethylenically unsaturated monomers used to make the latex copolymer; or greater than about 0.5 wt.

% of the ethylenically unsaturated polar monomer, based on the total weight of ethylenically unsaturated monomers used to make the latex copolymer; or greater than about 1 wt. % of the ethylenically unsaturated polar monomer, based on the total weight of ethylenically unsaturated monomers used to make the latex copolymer. In some examples, the reactants include less than about 10 wt. % of the ethylenically unsaturated polar monomer, based on the total weight of ethylenically unsaturated monomers used to make the latex copolymer; or less than about 5 wt. % of the ethylenically unsaturated polar monomer, based on the total weight of ethylenically unsaturated monomers used to make the latex copolymer; or less than about 3 wt. % of the ethylenically unsaturated polar monomer, based on the total weight of ethylenically unsaturated monomers used to make the latex copolymer.

The reactants that form the latex copolymer also may include a chain transfer agent. In some examples, the reactants include at least about 0.1 wt. % of the chain transfer agent, based on the total weight of ethylenically unsaturated monomers used to make the latex copolymer; or at least about 0.25 wt. % of the chain transfer agent, based on the total weight of ethylenically unsaturated monomers used to make the latex copolymer; or at least about 0.5 wt. % of the chain transfer agent, based on the total weight of ethylenically unsaturated monomers used to make the latex copolymer. In some examples, the reactants may include less than about 2 wt. % of the chain transfer agent, based on the total weight of ethylenically unsaturated monomers used to make the latex copolymer; or less than about 1 wt. % of the chain transfer agent, based on the total weight of ethylenically unsaturated monomers used to make the latex copolymer; or less than about 0.75 wt. % of the chain transfer agent, based on the total weight of ethylenically unsaturated monomers used to make the latex copolymer. The chain transfer agent may include any suitable chain transfer agent, such as a thiol. In some examples, the chain transfer agent includes or consists of a mercaptan, such as dodecyl mercaptan.

In some examples, the reactants optionally include another monomer. Suitable additional monomer(s) include, for example, methyl acrylate, ethyl acrylate, propyl acrylate, butyl acrylate, 2-ethylhexyl acrylate, methyl methacrylate, ethyl methacrylate, propyl methacrylate, 2-ethylhexyl methacrylate, hydroxyethyl acrylate, hydroxyethyl methacrylate, hydroxybutyl acrylate, hydroxybutyl methacrylate, glycidyl methacrylate, 4-hydroxybutyl acrylate glycidyl ether, 2-(acetoacetoxy)ethyl methacrylate (AAEM), diacetone acrylamide (DAAM), acrylamide, methacrylamide, methylol (meth) acrylamide, styrene, α-methyl styrene, vinyl toluene, vinyl acetate, vinyl propionate, allyl methacrylate, and mixtures thereof. Some preferred monomers include styrene, methyl methacrylate, methacrylic acid, acetoacetoxy ethyl methacrylate, butyl acrylate, and the like. The additional monomer may be selected to reduce a glass transition temperature ($T_g$) of the latex copolymer. Thus, the additional monomer may have a homopolymer $T_g$ that is less than the homopolymer $T_g$ of the methacrylate having the alkyl group including between 2 and 20 carbon atoms. For example, the additional monomer may have a homopolymer glass transition temperature that is less than −25° C., or less than about −35° C., or less than about −50° C. In some implementations, the additional monomer includes or consists of an alkyl acrylate, such as 2-ethylhexyl acrylate. When present, the reactants may include at least about 10 wt. % of the additional monomer, based on the total weight of ethylenically unsaturated monomers used to make the latex copolymer; or at least about 20 wt. % of the additional monomer, based on the total weight of ethylenically unsaturated monomers used to make the latex copolymer; or at least about 30 wt. % of the additional monomer, based on the total weight of ethylenically unsaturated monomers used to make the latex copolymer. In some examples, the reactants may include less than about 80 wt. % of the additional monomer, based on the total weight of ethylenically unsaturated monomers used to make the latex copolymer; or less than about 60 wt. % of the additional monomer, based on the total weight of ethylenically unsaturated monomers used to make the latex copolymer; or less than about 50 wt. % of the additional monomer, based on the total weight of ethylenically unsaturated monomers used to make the latex copolymer.

In some examples, the reactants further include a ureido-functional monomer. The ureido-functional monomer may affect adhesion of the latex copolymer to substrates, including polymeric roofing membrane substrates. In some examples, the ureido-functional monomer includes a ureido-functional ethylenically unsaturated monomer, such as a ureido-functional methacrylic monomer. Example ureido-functional ethylenically unsaturated monomer include those available under the trade designations SIPOMER® WAM and SIPOMER® WAM II available from Solvay S.A., Brussels, Belgium, and VISIOMER® MEEU 25 M from Evonik Industries, Essen, Germany.

In some examples, the reactants further include a seed latex. The seed latex may function as a polymerization growth site and may affect a final particle size of the latex copolymer The latex copolymers disclosed above may, in some examples, be formed and/or stabilized with one or more emulsifiers (e.g., surfactants), used either alone or together. Examples of suitable nonionic emulsifiers include tert-octylphenoxyethylpoly(39)-ethoxyethanol, dodecyloxypoly(10)ethoxyethanol, nonylphenoxyethyl-poly(40)ethoxyethanol, polyethylene glycol 2000 monooleate, ethoxylated castor oil, fluorinated alkyl esters and alkoxylates, polyoxyethylene (20) sorbitan monolaurate, sucrose monococoate, di(2-butyl) phenoxypoly(20)ethoxyethanol, hydroxyethylcellulosepolybutyl acrylate graft copolymer, dimethyl silicone polyalkylene oxide graft copolymer, poly(ethylene oxide)poly(butyl acrylate) block copolymer, block copolymers of propylene oxide and ethylene oxide, 2,4,7,9-tetramethyl-5-decyne-4,7-diol ethoxylated with ethylene oxide, N-polyoxyethylene(20)lauramide, N-lauryl-N-polyoxyethylene(3)amine and poly(10)ethylene glycol dodecyl thioether. Examples of suitable anionic emulsifiers include sodium lauryl sulfate, sodium dodecylbenzenesulfonate, potassium stearate, sodium dioctyl sulfosuccinate, sodium dodecyldiphenyloxide disulfonate, nonylphenoxyethylpoly(1)ethoxyethyl sulfate ammonium salt, sodium styrene sulfonate, sodium dodecyl allyl sulfosuccinate, linseed oil fatty acid, sodium, potassium, or ammonium salts of phosphate esters of ethoxylated nonylphenol or tridecyl alcohol, sodium octoxynol-3-sulfonate, sodium cocoyl sarcocinate, sodium 1-alkoxy-2-hydroxypropyl sulfonate, sodium alpha-olefin ($C_{14}$-$C_{16}$)sulfonate, sulfates of hydroxyalkanols, tetrasodium N-(1,2-dicarboxy ethyl)-N-octadecylsulfosuccinamate, disodium N-octadecylsulfosuccinamate, disodium alkylamido poly-ethoxy sulfosuccinate, disodium ethoxylated nonylphenol half ester of sulfosuccinic acid and the sodium salt of tert-octylphenoxyethoxypoly(39)ethoxyethyl sulfate.

The latex copolymer may be polymerized using chain growth polymerization. One or more water-soluble free radical initiators may be used in the chain growth polymerization. Initiators suitable for use in the coating compositions will be known to persons having ordinary skill in the art or can be determined using standard methods. Representative water-soluble free radical initiators include hydrogen peroxide; tert-butyl peroxide; alkali metal persulfates such as sodium, potassium and lithium persulfate; ammonium persulfate; and mixtures of such initiators with a reducing agent. Representative reducing agents include sulfites such as alkali metal metabisulfite, hydrosulfite, and hyposulfite; sodium formaldehyde sulfoxylate; and reducing sugars such as ascorbic acid and isoascorbic acid. The amount of initiator is preferably from about 0.01 to about 3 wt. %, based on the total weight of ethylenically unsaturated monomers used to make the latex copolymer. In a redox system the amount of reducing agent is preferably from 0.01 to 3 wt. %, based on the total weight of ethylenically unsaturated monomers used to make the latex copolymer. The polymerization reaction can be performed at a temperature in the range of from about 10° C. to about 100° C.

The latex copolymer may exhibit a measured glass transition temperature of less than about −10° C., or less than about −15° C., or less than about −20° C. In some examples, the latex copolymer exhibits a measured glass transition temperature of greater than about −50° C., or greater than about −40° C., or greater than about −30° C. For example, the latex copolymer may exhibit a measured glass transition temperature of between about −50° C. and about −20° C. The glass transition temperature may be measured by air drying a sample overnight and analyzing the dried sample on a Q2000 DSC from TA Instruments using a heat-cool-heat cycle from −75° C. to 150° C. and back at a rate of 20° C. per minute. The glass transition temperature was measured from the midpoint of the transition on the second heat cycle.

In some examples, the latex copolymer may include both soluble and insoluble fractions. A gel fraction of the latex copolymer may be determined by soaking a sample of air-dried latex copolymer in a porous bag or pouch in a solvent, such as tetrahydrofuran (THF). The gel fraction is determined as the final weight of the sample (after drying) divided by the initial weight of the sample (after drying). A more detailed description of a suitable methodology is provided in the examples section. In some examples, the latex copolymer may exhibit a gel fraction of between 0% and about 10%, or between 0% and about 5%, or between 0% and about 3.5%, or between about 1.0% and about 3.5%.

The solubilized portion of the latex copolymer from the gel fraction test preferably exhibits a weight average molecular weight. In some examples, the weight average molecular weight may be less than about 300,000 g/mol. In other examples, the weight average molecular weight may be less than about 230,000 g/mol or less than about 200,000 g/mol. In some examples, the weight average molecular weight may be greater than about 50,000 g/mol, or between about 50,000 g/mol and about 230,000 g/mol, or between about 50,000 and about 200,000 g/mol.

The latex copolymer may exhibit any volume average particle size, as the average particle size is not believed to be important. In some examples, the latex copolymer may exhibit a volume average particle size of between about 150 nm and about 550 nm. The volume average particle size may be determined using a Nanotrac Wave II particle size analyzer from Microtrac Inc., Montgomeryville, Pa.

In some examples, the latex emulsion or aqueous coating composition may include a total solids content of between about 50% and about 60%, or about 55%.

The latex emulsion may exhibit a viscosity suitable for application of the latex emulsion, either alone or in combination with one or more additives in a coating composition, to a substrate using typical coating application techniques, such as rolling, brushing, dipping, spraying, or the like.

The latex emulsion may be used to coat substrates, e.g., as a primer coat or a topcoat. For example, the latex emulsion may be used to coat polymeric roofing membranes, such as thermoplastic polyolefin (TPO) membranes, ethylene propylene diene monomer (EPDM) rubber membranes, PVC membranes, or the like. The polymeric roofing membranes may be used as roofing materials. The latex emulsion may be applied directly to the polymeric roofing membrane and preferably exhibits desirable dry and wet adhesion to the polymeric roofing membrane. For example, a coating formed from the latex emulsion preferably exhibits a wet adhesion of greater than about 1 pounds per linear inch, or greater than about 2 pounds per linear inch, or greater than about 4 pounds per linear inch when tested using fabric embedded peel adhesion testing per ASTM C794 at a coverage of about 80 ft$^2$/gallon. For the fabric embedded peel adhesion testing, the latex emulsion was applied to the polymeric roofing membrane at a coverage of about 80 ft$^2$/gallon. Half of the coating composition mass was brushed onto virgin TPO and a 4" wide strip of non-woven polyester fabric available under the trade designation Henry 296 ElastoTape® Repair Fabric from Henry Company, El Segundo, Calif. was embedded into the coating. The remaining coating composition mass was then brushed onto the embedded polyester fabric. Samples were dried under ambient conditions for 14 days. Dry adhesion was then measured using an MTS Insight® Electromechanical Testing System. The fabric was gripped in one clamp of the MTS Insight® Electromechanical Testing System and the virgin TPO sheet in the other clip. The pulling rate was 2 inches per minute and 2 inches of the samples were tested.

After dry adhesion testing, the samples were immersed in water for 7 days. Wet adhesion was then tested according to ASTM C794 using an MTS Insight® Electromechanical Testing System. The fabric was gripped in one clamp of the MTS Insight® Electromechanical Testing System and the virgin TPO sheet in the other clip. The pulling rate was 2 inches per minute and 2 inches of the samples were tested.

In some examples, rather than being used neat to coat a substrate, the latex emulsion may be part of an aqueous coating composition that include at least one additive. The at least one additive may include, for example, a dispersant, a biocide, a fungicide, an UV stabilizer, a thickener, a wetting agent, a defoamer, a filler, a pigment or colorant, or combinations thereof.

The aqueous coating composition may contain one or more optional ingredients that are or contain VOCs. Such ingredients will be known to persons having ordinary skill in the art or can be determined using standard methods. Desirably, the coating compositions are low VOC, and preferably include not more than 150 g VOC/L composition, excluding water weight (about 15% w/v) by U.S.A. EPA Method 24, preferably not more than about 100 g VOC/L composition (about 10% w/v), more preferably not more than about 50 g VOC/L composition (about 5% w/v), and most preferably not more than 20 g VOC/L composition (about 2% w/v), for example not more than about 10 g VOC/L composition (about 1% w/v) or not more than about 8 g VOC/L composition (about 0.8% w/v) volatile organic compounds.

The aqueous coating composition may contain one or more optional coalescents to facilitate film formation. Coalescents suitable for use in the coating compositions will be known to persons having ordinary skill in the art or can be determined using standard methods. Exemplary coalescents include glycol ethers such those sold under the trade names as EASTMAN™ EP, EASTMAN™ DM, EASTMAN™ DE, EASTMAN™ DP, EASTMAN™ DB and EASTMAN™ PM from Eastman Chemical Company, Kingsport, Tenn., and ester alcohols such as those sold under the trade names TEXANOL™ ester alcohol from Eastman Chemical Company. The optional coalescent may be a low VOC coalescent such as is described in U.S. Pat. No. 6,762,230 B2. The coating compositions may include a low VOC coalescent in an amount of at least about 0.5 wt. %, or at least about 1 part by weight, and or at least about 2 wt. %, based on a total non-volatile weight of the latex copolymer. The coating compositions also may include a low VOC coalescent in an amount of less than about 10 wt. %, or less than about 6 wt. %, or less than about 4 wt. %, based on a total non-volatile weight of the latex copolymer.

Other optional additives for use in the aqueous coating compositions herein are described in Koleske et al., Paint and Coatings Industry, April, 2003, pages 12-86. Some performance enhancing additives that may optionally be employed include coalescing solvent(s), defoamers, dispersants, amines, preservatives, biocides, mildewcides, fungicides, glycols, surface active agents, pigments, colorants, dyes, surfactants, thickeners, heat stabilizers, leveling agents, anti-cratering agents, curing indicators, plasticizers, fillers, sedimentation inhibitors, ultraviolet-light absorbers, optical brighteners, external crosslinkers, and the like to modify properties of the aqueous coating composition.

The disclosed coating compositions may include a surface-active agent (e.g., surfactant) that modifies the interaction of the coating composition with the substrate or with a prior applied coating. The surface-active agent affects qualities of the aqueous coating composition including how the aqueous coating composition is handled, how it spreads across the surface of the substrate, and how it bonds to the substrate. The surface-active agent can modify the ability of the aqueous coating composition to wet a substrate and also may be referred to as a wetting agent. Surface-active agents may also provide leveling, defoaming, or flow control properties, and the like. If the aqueous coating composition includes a surface-active agent, the surface-active agent is preferably present in an amount of less than 5 wt. %, based on the total weight of the aqueous coating composition. Surface-active agents suitable for use in the coating composition will be known to persons having ordinary skill in the art or can be determined using standard methods. Some suitable surface-active agents include those available under the trade designations STRODEX™ KK-95H, STRODEX™ PLF100, STRODEX™ PKOVOC, STRODEX™ LFK70, STRODEX™ SEK50D and DEXTROL™ 0050 from Dexter Chemical L.L.C., Bronx, N.Y.; HYDROPALAT™ 100, HYDROPALAT™ 140, HYDROPALAT™ 44, HYDROPALAT™ 5040 and HYDROPALAT™ 3204 from Cognis Corporation, Cincinnati, Ohio; LIPOLIN™ A, DISPERS™ 660C, DISPERS™ 715W and DISPERS™ 750W from Degussa Corporation, Parsippany, N.J.; BYK™ 156, BYK™ 2001 and ANTI-TERRA™ 207 from Byk Chemie, Wallingford, Conn.; DISPEX™ A40, DISPEX™ N40, DISPEX™ R50, DISPEX™ G40, DISPEX™ GA40, EFKA™ 1500, EFKA™ 1501, EFKA™ 1502, EFKA™ 1503, EFKA™ 3034, EFKA™ 3522, EFKA™ 3580, EFKA™ 3772, EFKA™ 4500, EFKA™ 4510, EFKA™ 4520, EFKA™ 4530, EFKA™ 4540, EFKA™ 4550, EFKA™ 4560, EFKA™ 4570, EFKA™ 6220, EFKA™ 6225, EFKA™ 6230 and EFKA™ 6525 from Ciba Specialty Chemicals, Tarrytown, N.Y.; SURFYNOL™ CT-111, SURFYNOL™ CT-121, SURFYNOL™ CT-131, SURFYNOL™ CT-211, SURFYNOL™ CT 231, SURFYNOL™ CT-136, SURFYNOL™ CT-151, SURFYNOL™ CT-171, SURFYNOL™ CT-234, CARBOWET™ DC-01, SURFYNOL™ 104, SURFYNOL™ PSA-336, SURFYNOL™ 420, SURFYNOL™ 440, ENVIROGEM™ AD-01 and ENVIROGEM AE01 from Air Products & Chemicals, Inc., Allentown, Pa.; TAMOL™ 1124, TAMOL 850, TAMOL 681, TAMOL™ 731 and TAMOL™ SG-1 from Rohm and Haas Co., Philadelphia, Pa.; IGEPAL™ CO-210, IGEPAL™ CO-430, IGEPAL™ CO-630, IGEPAL™ CO-730, and IGEPAL™ CO-890 from Rhodia Inc., Cranbury, N.J.; T-DET™ and T-MULZ™ products from Harcros Chemicals Inc., Kansas City, Kans.; polydimethylsiloxane surface-active agents (such as those available under the trade designations SILWET™ L-760 and SILWET™ L-7622 from OSI Specialties, South Charleston, W.Va., or BYK™ 306 from Byk-Chemie) and fluorinated surface-active agents (such as that commercially available as FLUORAD™ FC-430 from 3M Co., St. Paul, Minn.).

In some examples, the surface-active agent may be a defoamer. Some suitable defoamers include those sold under the trade names BYK™ 018, BYK™ 019, BYK™ 020, BYK™ 022, BYK™ 025, BYK™ 032, BYK™ 033, BYK™ 034, BYK™ 038, BYK™ 040, BYK™ 051, BYK™ 060, BYK™ 070, BYK™ 077 and BYK™ 500 from Byk Chemie; SURFYNOL™ DF-695, SURFYNOL™ DF-75, SURFYNOL™ DF-62, SURFYNOL™ DF-40 and SURFYNOL™ DF-110D from Air Products & Chemicals, Inc.; DEEFO™ 3010A, DEEFO™ 2020E/50, DEEFO™ 215, DEEFO™ 806-102 and AGITAN™ 31BP from Munzing Chemie GmbH, Heilbronn, Germany; EFKA 2526, EFKA 2527 and EFKA 2550 from Ciba Specialty Chemicals; FOAMAX™ 8050, FOAMAX™ 1488, FOAMAX™ 7447, FOAMAX™ 800, FOAMAX™ 1495 and FOAMAX 810 from Degussa Corp.; FOAMASTER™ 714, FOAMASTER™ A410, FOAMASTER™ 111, FOAMASTER™ 333, FOAMASTER™ 306, FOAMASTER™ SA-3, FOAMASTER™ AP, DEHYDRAN™ 1620, DEHYDRAN™ 1923 and DEHYDRAN™ 671 from Cognis Corp.

The aqueous coating composition also may contain one or more optional external crosslinkers. External crosslinkers may improve tensile strength of a coating formed from the aqueous coating composition. Example external crosslinkers include silanes, zinc oxide pigments, nanozinc, ZINPLEX 15 (available from Munzing, Bloomfield, N.J.), and the like.

The aqueous coating composition also may contain one or more optional pigments. Pigments suitable for use in the coating compositions will be known to persons having ordinary skill in the art or can be determined using standard methods. Some suitable pigments include titanium dioxide white, carbon black, lampblack, black iron oxide, red iron oxide, yellow iron oxide, brown iron oxide (a blend of red and yellow oxide with black), phthalocyanine green, phthalocyanine blue, organic reds (such as naphthol red, quinacridone red and toulidine red), quinacridone magenta, quinacridone violet, DNA orange, or organic yellows (such as Hansa yellow). The aqueous coating composition can also include a gloss control additive or an optical brightener, such as that commercially available under the trade designation UVITEX™ OB from Ciba-Geigy.

In some examples, the aqueous coating composition may include an optional filler or inert ingredient. Fillers or inert ingredients extend, lower the cost of, alter the appearance of, or provide desirable characteristics to the aqueous coating composition before and after curing. Fillers and inert ingredients suitable for use in the aqueous coating composition will be known to persons having ordinary skill in the art or can be determined using standard methods. Some suitable fillers or inert ingredients include, for example, clay, glass beads, calcium carbonate, talc, silicas, feldspar, mica, barytes, ceramic microspheres, calcium metasilicates, organic fillers, and the like. Suitable fillers or inert ingredients are preferably present in an aggregate amount of less than about 40 wt. %, such as less than about 15 wt. %, based on the total weight of the aqueous coating composition.

In certain applications it may also be desirable to include in the aqueous coating composition a biocide, fungicide, or the like. Some suitable biocides or fungicides include those sold under the trade names ROZONE™ 2000, BUSAN™ 1292 and BUSAN 1440 from Buckman Laboratories, Memphis, Tenn.; POLYPHASE™ 663 and POLYPHASE™ 678 from Troy Chemical Corp., Florham Park, N.J.; and KATHON™ LX from Rohm and Haas Co.

The aqueous coating composition may also include other ingredients that modify properties of the aqueous coating composition as it is stored, handled, or applied, and at other or subsequent stages. Waxes, flatting agents, rheology control agents, mar and abrasion additives, and other similar performance enhancing additives may be employed as needed in amounts effective to upgrade the performance of the cured coating and the aqueous coating composition. Some suitable wax emulsions to improve coating physical performance include those sold under the trade names MICHEM™ Emulsions 32535, 21030, 61335, 80939M and 7173MOD from Michelman, Inc. Cincinnati, Ohio and CHEMCOR™ 20N35, 43A40, 950C25 and 10N30 from ChemCor of Chester, N.Y. Some suitable rheology control agents include those sold under the trade names RHEOVIS™ 112, RHEOVIS™ 132, RHEOVIS™, VISCALEX™ HV30, VISCALEX™ AT88, EFKA™ 6220 and EFKA™0 6225 from Ciba Specialty Chemicals; BYK™ 420 and BYK™ 425 from Byk Chemie; RHEOLATE™ 205, RHEOLATE™ 420 and RHEOLATE™ 1 from Elementis Specialties, Hightstown, N.J.; ACRYSOL™ L TT-615, ACRYSOL™ RM-5, ACRYSOL™ RM-6, ACRYSOL™ RM-8W, ACRYSOL™ RM-2020 and ACRYSOL™ RM-825 from Rohm and Haas Co.; NATROSOL™ 250LR from Hercules Inc., Wilmington, Del. and CELLOSIZE™ QP09L from Dow Chemical Co., Midland, Mich. Desirable performance characteristics of the coating include adhesion, chemical resistance, abrasion resistance, hardness, gloss, reflectivity, appearance, or combinations of these characteristics, and other similar characteristics. For example, the composition may include abrasion resistance promoting adjuvants such as silica or aluminum oxide (e.g., sol gel processed aluminum oxide).

In certain applications it may also be desirable to include in the aqueous coating composition an optional UV stabilizer. Concentration of the optional UV stabilizer in the aqueous coating composition will be known to persons having ordinary skill in the art or can be determined using standard methods. UV stabilizers may include encapsulated hydroxyphenyl-triazine compositions and other compounds known to persons having ordinary skill in the art, for example, TINUVIN™ 477DW, commercially available from BASF Corporation.

In some examples, the aqueous coating composition may optionally a thickener. Thickeners may include hydroxyethyl cellulose; hydrophobically modified ethylene oxide urethane; processed attapulgite, a hydrated magnesium aluminosilicate; and other thickeners known to persons having ordinary skill in the art. For example, thickeners may include CELLOSIZE™ QP-09-L and ACRYSOL™ RM-2020NPR, available from Dow Chemical Company; and ATTAGEL™ 50, available from BASF Corporation. Concentration of the optional thickener stabilizer in the aqueous coating composition will be known to persons having ordinary skill in the art or can be determined using standard methods.

Like the latex emulsion, the aqueous coating composition may be used to coat substrates, e.g., as a primer coat or a topcoat. For example, the aqueous coating composition may be used to coat polymeric roofing membranes, such as TPO membranes, EPDM rubber membranes, PVC membranes, or the like. The polymeric roofing membranes may be used as roofing materials. The aqueous coating composition may be applied directly to the polymeric roofing membrane and preferably exhibits desirable dry and wet adhesion to the polymeric roofing membrane. For example, a coating formed from the aqueous coating composition preferably exhibits a wet adhesion of greater than about 1 pound per linear inch, or greater than about 2 pounds per linear inch, or greater than about 4 pounds per linear inch when tested using fabric embedded peel adhesion testing per ASTM C794. In some examples, the latex-based coating 14 may be a primer coat and a topcoat 16 may be applied on the latex-based coating 14.

Although the latex emulsions and aqueous coating compositions have been described as being used with roofing membranes, the latex emulsions and aqueous coating compositions may be used in other coating applications. For example, the latex emulsions and aqueous coating compositions may be used as tie layers for adhering other coating layers (such as other latexes), a coating for relatively low surface energy substrates (e.g., substrates having a surface energy of less than about 40 dynes/cm, less than about 35 dynes/cm, less than about 30 dynes/cm, or less than about 25 dynes/cm) (e.g., for low-surface-energy polymers such as PVC, EPDM, polyolefins, or the like), or the like.

Further, while the latex emulsions and aqueous coating compositions have been described as standalone compositions, in other examples, the latex emulsions and aqueous coating compositions may be used as additives to other latex emulsions or aqueous coating compositions. By including a latex copolymer formed from reactants comprising butyl methacrylate, wherein the reactants comprise at least 20 wt. % butyl methacrylate as an additive in another latex emulsion or aqueous coating composition, one or more of the advantages of latex emulsions or aqueous coating compositions described herein may be realized in combination with properties contributed by the other latex emulsion or aqueous coating composition.

Clause 1: A latex emulsion comprising: an aqueous carrier liquid; and a latex copolymer formed from reactants comprising butyl methacrylate, 2-ethylhexyl methacrylate, VeoVa™ 10, or combinations thereof, wherein the reactants comprise at least 20 wt. % of the butyl methacrylate, 2-ethylhexyl methacrylate, VeoVa™ 10, or combinations thereof, based on the total weight of ethylenically unsaturated monomers used to make the latex copolymer.

The latex emulsion of clause 1, wherein a coating formed from the latex emulsion optionally and preferably exhibits a wet adhesion to a thermoplastic polyolefin roofing membrane of greater than about 1 pound per linear inch when tested using fabric embedded peel adhesion testing per ASTM C794 at a coverage of about 80 $ft^2$/gallon.

Clause 2: The latex emulsion of clause 1, wherein the reactants comprise at least 25 wt. % of the butyl methacrylate, 2-ethylhexyl methacrylate, VeoVa™ 10, or combinations thereof, based on the total weight of ethylenically unsaturated monomers used to make the latex copolymer.

Clause 3: The latex emulsion of clause 1, wherein the reactants comprise at least 30 wt. % of the butyl methacrylate, 2-ethylhexyl methacrylate, VeoVa™ 10, or combinations thereof, based on the total weight of ethylenically unsaturated monomers used to make the latex copolymer.

Clause 4: The latex emulsion of clause 1, wherein the reactants comprise at least 50 wt. % of the butyl methacrylate, 2-ethylhexyl methacrylate, VeoVa™ 10, or combinations thereof, based on the total weight of ethylenically unsaturated monomers used to make the latex copolymer.

Clause 5: The latex emulsion of any one of clauses 1 to 4, wherein the butyl methacrylate, 2-ethylhexyl methacrylate, VeoVa™ 10, or combinations thereof comprises n-butyl methacrylate or a mixture of n-butyl methacrylate and 2-ethylhexyl methacrylate.

Clause 6: The latex emulsion of clause 1, wherein the reactants comprise between about 20 and about 50 wt. % of the butyl methacrylate, 2-ethylhexyl methacrylate, VeoVa™ 10, or combinations thereof, based on the total weight of ethylenically unsaturated monomers used to make the latex copolymer.

Clause 7: An aqueous roof coating composition comprising: an aqueous carrier liquid; a dispersant, a biocide, a fungicide, an UV stabilizer, a thickener, a wetting agent, a defoamer, a filler, a pigment or colorant, or combinations thereof; and a latex copolymer formed from reactants comprising a vinyl monomer having an alkyl group including between 2 and 20 carbon atoms, wherein the reactants comprise at least 20 wt. % of the vinyl monomer having an alkyl group including between 2 and 12 carbon atoms, based on the total weight of ethylenically unsaturated monomers used to make the latex copolymer, and wherein a homopolymer formed from the vinyl monomer exhibits a glass transition temperature of between about $-10°$ C. and about $30°$ C.;

The aqueous roof coating composition of clause 7, wherein a coating formed from the coating composition optionally and preferably exhibits a wet adhesion to a thermoplastic polyolefin roofing membrane of greater than about 1 pounds per linear inch when tested using fabric embedded peel adhesion testing per ASTM C794 at a coverage of about 80 ft$^2$/gallon.

Clause 8: A method comprising: reacting reactants comprising a vinyl monomer having an alkyl group including between 2 and 20 carbon atoms to form a latex emulsion including a latex copolymer, wherein the reactants comprise at least 20 wt. % of the vinyl monomer having an alkyl group including between 2 and 20 carbon atoms, based on the total weight of ethylenically unsaturated monomers used to make the latex copolymer, wherein a homopolymer formed from the vinyl monomer exhibits a glass transition temperature of between about $-10°$ C. and about $30°$ C.

The method of clause 8, wherein a coating formed from the latex emulsion optionally and preferably exhibits a wet adhesion to a thermoplastic polyolefin roofing membrane of greater than about 1 pound per linear inch when tested using fabric embedded peel adhesion testing per ASTM C794 at a coverage of about 80 ft$^2$/gallon.

Clause 9: The aqueous coating composition or method of clause 7 or 8, wherein the reactants comprise at least 25 wt. % of the vinyl monomer having an alkyl group including between 2 and 20 carbon atoms, based on the total weight of ethylenically unsaturated monomers used to make the latex copolymer.

Clause 10: The aqueous coating composition or method of clause 7 or 8, wherein the reactants comprise at least 30 wt. % of the vinyl monomer having an alkyl group including between 2 and 20 carbon atoms, based on the total weight of ethylenically unsaturated monomers used to make the latex copolymer.

Clause 11: The aqueous coating composition or method of clause 7 or 8, wherein the reactants comprise at least 50 wt. % of the vinyl monomer having an alkyl group including between 2 and 20 carbon atoms, based on the total weight of ethylenically unsaturated monomers used to make the latex copolymer.

Clause 12: The aqueous coating composition or method of any one of clauses 7 to 11, wherein the reactants comprise between 20 and 50 wt. % of the vinyl monomer having an alkyl group including between 2 and 20 carbon atoms, based on the total weight of ethylenically unsaturated monomers used to make the latex copolymer.

Clause 13: The aqueous coating composition or method of any one of clauses 7 to 12, wherein the vinyl monomer having an alkyl group including between 2 and 20 carbon atoms comprises a methacrylate having an alkyl group including between 4 and 12 carbon atoms.

Clause 14: The aqueous coating composition or method of any one of clauses 7 to 13, wherein the vinyl monomer having an alkyl group including between 2 and 20 carbon atoms comprises laurel methacrylate, n-butyl methacrylate, iso-butyl methacrylate, t-butyl methacrylate, sec-butyl methacrylate, 2-ethylhexyl methacrylate, VeoVa™ 10, or combinations thereof.

Clause 15: The latex emulsion, aqueous coating composition, or method of any one of clauses 1 to 14, wherein the reactants further comprise: an ethylenically unsaturated polar monomer; and a chain transfer agent.

Clause 16: The latex emulsion, aqueous coating composition, or method of cause 15, wherein the reactants comprise at least about 0.1 part by weight of the ethylenically unsaturated polar monomer, based on the total weight of ethylenically unsaturated monomers used to make the latex copolymer.

Clause 17: The latex emulsion, aqueous coating composition, or method of clause 15, wherein the reactants comprise between about 0.1 and about 10 wt. % of the ethylenically unsaturated polar monomer, based on the total weight of ethylenically unsaturated monomers used to make the latex copolymer.

Clause 18: The latex emulsion, aqueous coating composition, or method of clause 15, wherein the reactants comprise between about 0.1 and about 5 wt. % of the ethylenically unsaturated polar monomer, based on the total weight of ethylenically unsaturated monomers used to make the latex copolymer.

Clause 19: The latex emulsion, aqueous coating composition, or method of any one of clauses 15 to 18, wherein the ethylenically unsaturated polar monomer comprises an acid-functional ethylenically unsaturated monomer.

Clause 20: The latex emulsion, aqueous coating composition, or method of clause 19, wherein the ethylenically unsaturated acid-functional monomer comprises acrylic acid, methacrylic acid, an at least partially neutralized acrylic acid, an at least partially neutralized methacrylic acid, or combinations thereof.

Clause 21: The latex emulsion, aqueous coating composition, or method of any one of clauses 15 to 20, wherein the reactants comprise at least about 0.1 part by weight of the chain transfer agent, based on the total weight of ethylenically unsaturated monomers used to make the latex copolymer.

Clause 22: The latex emulsion, aqueous coating composition, or method of any one of clauses 15 to 20, wherein the reactants comprise between about 0.1 and about 1 part by weight of the chain transfer agent, based on the total weight of ethylenically unsaturated monomers used to make the latex copolymer.

Clause 23: The latex emulsion, aqueous coating composition, or method of any one of clauses 15 to 22, wherein the chain transfer agent comprises a mercaptan.

Clause 24: The latex emulsion, aqueous coating composition, or method of clause 23, wherein the chain transfer agent comprises dodecyl mercaptan.

Clause 25: The latex emulsion, aqueous coating composition, or method of any one of clauses 1 to 24, wherein the reactants further comprise a second (meth)acrylate, wherein the second (meth)acrylate forms a homopolymer that has a glass transition temperature that is less than −25° C.

Clause 26: The latex emulsion, aqueous coating composition, or method of clause 25, wherein the second (meth)acrylate comprises an alkyl acrylate.

Clause 27: The latex emulsion, aqueous coating composition, or method of clause 26, wherein the second (meth)acrylate comprises 2-ethylhexyl acrylate.

Clause 28: The latex emulsion, aqueous coating composition, or method of any one of clauses 25 to 26, wherein the reactants comprise between about 20 and about 80 wt. % of the second (meth)acrylate, based on the total weight of ethylenically unsaturated monomers used to make the latex copolymer.

Clause 29: The latex emulsion, aqueous coating composition, or method of any one of clauses 1 to 28, wherein the reactants further comprise a ureido-functional monomer.

Clause 30: The latex emulsion, aqueous coating composition, or method of clause 29, wherein the ureido-functional monomer comprises a ureido-functional ethylenically unsaturated monomer.

Clause 31: The latex emulsion, aqueous coating composition, or method of any one of clauses 1 to 30, wherein the latex copolymer exhibits a volume average particle size of between about 150 nm and about 550 nm.

Clause 32: The latex emulsion, aqueous coating composition, or method of any one of clauses 1 to 31, wherein a coating formed from the latex emulsion or the aqueous coating composition exhibits a wet adhesion of greater than about 2 pounds per linear inch when tested using fabric embedded peel adhesion testing per ASTM C794.

Clause 33: The latex emulsion, aqueous coating composition, or method of any one of clauses 1 to 32, wherein the latex copolymer exhibits a glass transition temperature of less than about −10° C.

Clause 34: The latex emulsion, aqueous coating composition, or method of any one of clauses 1 to 30, wherein the latex copolymer exhibits a glass transition temperature of between about −50° C. and about −20° C.

Clause 35: The latex emulsion, aqueous coating composition, or method of any one of clauses 1 to 34, wherein the latex copolymer exhibits a gel fraction of between 0% and about 5%, and wherein the solubilized portion of the latex copolymer exhibits a weight average molecular weight of less than about 230,000 g/mol.

Clause 36: The latex emulsion, aqueous coating composition, or method of any one of clauses 1 to 34, wherein the latex copolymer exhibits a gel fraction of between 0% and about 3.5%, and wherein the solubilized portion of the latex copolymer exhibits a weight average molecular weight of between about 50,000 g/mol and about 200,000 g/mol.

Clause 37: The latex emulsion, aqueous coating composition, or method of any one of clauses 1 to 36, wherein the reactants further comprise a seed latex.

Clause 38: The latex emulsion, aqueous coating composition, or method of any one of clauses 1 to 37, comprising less than about 25 g/L volatile organic compounds.

Clause 39: The aqueous coating composition of any one of clauses 7 to 38, further comprising the biocide or the fungicide.

Clause 40: The aqueous coating composition of any one of clauses 7 to 39, further comprising the UV stabilizer.

Clause 41: The aqueous coating composition of any one of clauses 7 to 40, further comprising the thickener.

Clause 42: The aqueous coating composition of any one of clauses 7 to 41, further comprising the wetting agent.

Clause 43: The aqueous coating composition of any one of clauses 7 to 42, further comprising the defoamer.

Clause 44: The aqueous coating composition of any one of clauses 7 to 43, further comprising the filler.

Clause 45: The aqueous coating composition of any one of clauses 7 to 44, further comprising the pigment.

Clause 46: The aqueous coating composition of any one of clauses 7 to 45, the coalescent.

Clause 47: A roofing system comprising: a polymeric roofing membrane; and a coating on a surface of the polymeric roofing membrane, wherein the coating is formed from the latex emulsion or aqueous coating composition of any one of clauses 1 to 45.

Clause 48: A method comprising: coating a polymeric roofing membrane with a coating formed from the latex emulsion or aqueous coating composition of any one of clauses 1 to 45.

Clause 49: The roofing system or method of clause 47 or 48, wherein the polymeric roofing membrane comprises a thermoplastic polyolefin, ethylene propylene diene monomer rubber, or poly(vinyl chloride) roofing membrane.

Clause 50: The roofing system or method of any one of clauses 47 to 49, wherein the coating comprises a primer coat, further comprising a top coat on the primer coat.

The disclosure will now be illustrated with reference to the following non-limiting examples.

EXAMPLES

Latex Emulsion Synthesis Example 1

A monomer emulsion was made by first adding 330 g deionized water and 46.7 g Rhodafac BS-715 (available from Solvay S.A., Neder-Over-Heembeek, Brussels, Belgium) to a beaker and agitating. Then, each of the following was added: 33.6 g methacrylic acid, 22.8 g uriedo-functional methacrylic monomer, 5.0 g ammonium hydroxide (28%), 6.0 g dodecyl mercaptan, 510 g 2-ethylhexyl acrylate, and 600 g n-butyl methacrylate.

To a 3-liter cylindrical flask was charged 400 grams (g) deionized water and 40 g acrylic seed latex (30% non-volatile material). The flask was fitted with an agitator and a flask head and placed in a water bath heated to 80° C. When the reaction flask had equilibrated at 80° C., 3.6 g ammonium persulfate in 50 g of deionized water was added to the flask and held for 5 minutes.

After the hold, the monomer emulsion was fed to the flask over the course of 3 hours. Simultaneously, a solution of 1.2 g ammonium persulfate in 70 g deionized water was fed to the reactor over 3 hours. Temperature of the flask was maintained at between 80° C. and 85° C. throughout the additions.

At the conclusion of the feeds, the flask was held at 80° C. for 30 minutes before cooling to 60° C. and beginning redox post reaction. For the redox post reaction, an oxidizer solution was prepared by adding 1.7 g t-butyl hydroperoxide to 20 g deionized water with agitation. A reducer solution was prepared by adding 1.2 g erythorbic acid to 20 g deionized water with agitation. Following the post redox feed, the flask was cooled to 40° C., at which time 6.0 g ammonium hydroxide and 8.0 g 1,2-benzisothiazolin-3-one (a biocide available under the trade designation Proxel™ AQ from Lonza Group, Basel, Switzerland) were added to the flask.

The resulting latex emulsion had solids content of about 54.5%, a pH of about 7.6, a volume average particle size of about 197 nm, and a measured $T_g$ of about −26° C. Solids content was measured as follows: an aluminum weighing dish was weighted on an analytical balance and the weight recorded. Between about 0.5 g and about 0.75 g of latex was added to weighing dish and the weight recorded. The initial pan weight was subtracted from the pan plus latex weight to determine the weight of latex in the pan. Between about 1 g and about 2 g of water was added to the pan, and the pan was placed on a hot plate at 300° F. for 30 minutes. The pan was then cooled and re-weighed. The initial weight of the pan (without latex) was subtracted from the weight of the dried weight plus pan to determine the weight of the dried latex. The weight of the dried latex was divided by the weight of the starting latex to determine percent solids.

The volume average particle size may be determined using a Nanotrac Wave II particle size analyzer from Microtrac Inc., Montgomeryville, Pa.

The glass transition temperature was measured by air drying a sample overnight and analyzing the dried sample on a Q2000 DSC from TA Instruments using a heat-cool-heat cycle from −75° C. to 150° C. at a rate of 20° C. per minute. The glass transition temperature was measured from the midpoint of the transition on the second heat cycle.

Aqueous Coating Composition Example 1

TABLE 1

| Item Number | Material | Mass (g) |
| --- | --- | --- |
| 1 | Water | 154.90 |
| 2 | Tamol ™ 165A | 11.00 |
| 3 | Ammonium Hydroxide | 3.00 |
| 4 | Foamaster 111 | 5.00 |
| 5 | R-960 | 60.00 |
| 6 | Duramite | 400.00 |
| 7 | Foamaster 111 | 5.00 |
| 8 | Latex (about 55% solids) | 490.00 |
| 9 | Texanol | 6.74 |
| 10 | Polyphase 663 | 10.87 |
| 11 | Propylene Glycol | 11.00 |
| 12 | Natrosol 250HBR | 3.00 |
| | Total | 1160.51 |

Tamol™ 165A is a hydrophobic copolymer pigment dispersant including a polycarboxylate ammonium salt, residual monomers, and water available from Dow® Chemical Company, Midland, Mich. Foamaster® 111 is a nonionic liquid defoamer for water-based paints and coatings, water-based printing inks, and latex adhesive systems available from BASF, Ludwigshafen, Germany. R-960 is a titanium dioxide pigment including titanium dioxide, alumina, and amorphous silica available from E. I. du Pont de Nemours and Company, Wilmington, Del. under the trade designation DuPont® Ti-Pure® R-960. Duramite® is a medium particle size marble extender available from Imerys Carbonates, Paris, France. Texanol™ is an ester alcohol coalescent available from Eastman Chemical Company, Kingsport, Tenn. Polyphase® 663 is a zero VOC, water-based dispersion of fungicides and an algaecide available from Troy Corporation, Florham Park, N.J. Natrosol™ 250 HB is a hydroxyethylcellulose available from Ashland Global Specialty Chemicals, Covington, Ky. In Aqueous Coating Composition Example 1, the latex was the latex emulsion prepared according to Synthesis Example 1.

Items 1-6 were added in order then mixed for 20 minutes under high shear using a cowls blade. Items 7-10 were then added slowly. Items 11 and 12 were mixed together then added. The final mixture was then mixed for an additional 20 minutes with a good vortex.

Aqueous Coating Composition Comparative Example 1

In Aqueous Coating Composition Comparative Example 1, the latex was an all acrylic latex pressure sensitive adhesive available under the trade designation EPS 2113 from Engineered Polymer Solutions, Inc., Marengo, Illinois. Items 1-6 were added in order then mixed for 20 minutes under high shear using a cowls blade. Items 7-10 were then added slowly. Items 11 and 12 were mixed together then added. The final mixture was then mixed for an additional 20 minutes with a good vortex.

Peel Adhesion Testing

Aqueous coating compositions from Aqueous Coating Composition Example 1 and Aqueous Coating Composition Comparative Example 1 were applied to sheets of virgin TPO (available under the trade designation UltraPly™ TPO from Firestone, Nashville, Tenn.). The coating was applied at a coverage of about 80 ft$^2$/gallon. Half of the coating composition mass was brushed onto the virgin TPO and a 4" wide strip of non-woven polyester fabric available under the trade designation Henry 296 ElastoTape® Repair Fabric from Henry Company, El Segundo, California was embedded into the coating with one end left exposed to allow gripping by a clamp. The remaining coating composition mass was then brushed onto the embedded polyester fabric. The resulting coating was continuous with a generally consistent thickness.

Samples were dried under ambient conditions for 14 days. Dry adhesion was then measured using an MTS Insight® Electromechanical Testing System. The fabric was gripped in one clamp of the MTS Insight® Electromechanical Testing System and the virgin TPO sheet in the other clip. The pulling rate was 2 inches per minute and 2 inches of the samples were tested. The results are shown in Table 2.

TABLE 2

| Sample | Dry Adhesion (pounds per linear inch) |
| --- | --- |
| Aqueous Coating Composition Comparative Example 1 | 0.475 |
| Aqueous Coating Composition Example 1 | 1.25 |

After dry adhesion testing, the samples were then immersed in water for 7 days. Wet adhesion was then tested according to ASTM C794 using an MTS Insight® Electromechanical Testing System. The fabric was gripped in one clamp of the MTS Insight® Electromechanical Testing System and the virgin TPO sheet in the other clip. The pulling rate was 2 inches per minute and 2 inches of the samples were tested. The results are shown in Table 3.

TABLE 3

| Sample | Wet Adhesion (pounds per linear inch) |
|---|---|
| Aqueous Coating Composition Comparative Example 1 | 0 |
| Aqueous Coating Composition Example 1 | 3.6 |

Latex Emulsion Synthesis Example 2

A series of samples were prepared according to Latex Emulsion Synthesis Example 1, except the 2-ethylhexyl acrylate and n-butyl methacrylate were replaced with the monomers (and monomer ratios) shown in Table 4. The latexes were then formulated consistent with Aqueous Coating Composition Example 1. Peel testing was conducted consistent with the test method set forth above.

TABLE 4

| Sample | Monomers | Average Peel Strength (lbf/in) |
|---|---|---|
| 1 | 416 g n-butyl methacrylate<br>610 g butyl acrylate | 4.6845 |
| 2 | 200 g n-butyl methacrylate<br>111 g methyl methacrylate<br>250 g 2-ethylhexyl methacrylate<br>466 g ethylhexyl acrylate | 2.0905 |
| 3 | 555 g 2-ethylhexyl methacrylate<br>471 g ethylhexyl acrylate | 1.7085 |
| 4 | 416 g 2-ethylhexyl methacrylate<br>610.5 g butyl acrylate | 2.042 |
| 5 | 410 g VeoVa™ 10<br>472 g ethylhexyl acrylate<br>144 g methyl methacrylate | 2.476 |

Various examples have been described. These and other examples are within the scope of the following claims.

What is claimed is:

1. A composition comprising:
an aqueous carrier liquid; and
a latex copolymer formed from reactants comprising a chain transfer agent and a vinyl monomer having an alkyl group including between 2 and 20 carbon atoms, wherein the reactants comprise between 20 wt. % and 60 wt. % of the vinyl monomer having an alkyl group including between 2 and 12 carbon atoms, based on the total weight of ethylenically unsaturated monomers used to make the latex copolymer, and wherein a homopolymer formed from the vinyl monomer exhibits a glass transition temperature of between about −10° C. and about 30° C.;
wherein the latex copolymer exhibits a gel fraction of between 0% and about 10%, and wherein the solubilized portion of the latex copolymer exhibits a weight average molecular weight of less than about 230,000 g/mol;
wherein the latex copolymer exhibits a glass transition temperature of between about −50 ° C. and about −15° C.; and
wherein a coating formed from the composition exhibits a wet adhesion to a thermoplastic polyolefin roofing membrane of greater than about 1 pound per linear inch when tested using fabric embedded peel adhesion testing per ASTM D903 at a coverage of about 80 ft²/gallon.

2. The composition of claim 1, wherein the vinyl monomer comprises butyl methacrylate, ethylhexyl methacrylate, a vinyl ester of neodecanoic acid, or combinations thereof.

3. The composition of claim 2, wherein the butyl methacrylate, ethylhexyl methacrylate, the vinyl ester of neodecanoic acid, or combinations thereof comprises n-butyl methacrylate or a mixture of n-butyl methacrylate and ethylhexyl methacrylate.

4. The composition of claim 1, further comprising a dispersant, a biocide, a fungicide, an UV stabilizer, a thickener, a wetting agent, a defoamer, a filler, a pigment or colorant, or combinations thereof.

5. The composition of claim 1, wherein the reactants comprise between 30 wt. % and 60 wt. % of the vinyl monomer having an alkyl group including between 2 and 20 carbon atoms, based on the total weight of ethylenically unsaturated monomers used to make the latex copolymer.

6. The composition of claim 1, wherein the reactants comprise between 20 and 50 wt. % of the vinyl monomer having an alkyl group including between 2 and 20 carbon atoms, based on the total weight of ethylenically unsaturated monomers used to make the latex copolymer.

7. The composition of claim 1, wherein the reactants further comprise:
an ethylenically unsaturated polar monomer.

8. The composition of claim 7, wherein the chain transfer agent comprises dodecyl mercaptan.

9. The composition of claim 1, wherein the reactants further comprise a second (meth)acrylate, wherein the second (meth)acrylate forms a homopolymer that has a glass transition temperature that is less than −25° C.

10. The composition of claim 9, wherein the second (meth)acrylate comprises 2-ethylhexyl acrylate.

11. The composition of claim 1, wherein the reactants further comprise a ureido-functional ethylenically unsaturated monomer.

12. The composition of claim 1, wherein the coating formed from the composition exhibits a wet adhesion of greater than about 2 pounds per linear inch when tested using fabric embedded peel adhesion testing per ASTM D903.

13. The composition of claim 1, wherein the latex copolymer exhibits a glass transition temperature of between about −50° C. and about −20° C.

14. A roofing system comprising:
a polymeric roofing membrane; and
a coating on a surface of the polymeric roofing membrane, wherein the coating is formed from a composition comprising:
an aqueous carrier liquid; and
a latex copolymer formed from reactants comprising a chain transfer agent and a vinyl monomer having an alkyl group including between 2 and 20 carbon atoms, wherein the reactants comprise between 20 wt. % and 60 wt. % of the vinyl monomer having an alkyl group including between 2 and 12 carbon atoms, based on the total weight of ethylenically unsaturated monomers used to make the latex copolymer, and wherein a homopolymer formed from the vinyl monomer exhibits a glass transition temperature of between about −10° C. and about 30° C.;

wherein the latex copolymer exhibits a glass transition temperature of between about −50° C. and about −15° C.; and wherein a coating formed from the coating composition exhibits a wet adhesion to a thermoplastic polyolefin roofing membrane of greater than about 1 pound per linear inch when tested using fabric embedded peel adhesion testing per ASTM D903 at a coverage of about 80 ft$^2$/gallon.

15. The roofing system of claim 14, wherein the polymeric roofing membrane comprises a thermoplastic polyolefin, ethylene propylene diene monomer rubber, or poly (vinyl chloride) roofing membrane.

16. The roofing system of claim 14, wherein the coating comprises a primer coat, further comprising a top coat on the primer coat.

17. A method comprising:

reacting reactants comprising a chain transfer agent and a vinyl monomer having an alkyl group including between 2 and 20 carbon atoms to form a latex emulsion including a latex copolymer, wherein the reactants comprise between 20 wt. % and 60 wt. % of the vinyl monomer having an alkyl group including between 2 and 20 carbon atoms, based on the total weight of ethylenically unsaturated monomers used to make the latex copolymer, wherein a homopolymer formed from the vinyl monomer exhibits a glass transition temperature of between about −10° C. and about 30° C., wherein the latex copolymer exhibits a gel fraction of between 0% and about 5%, and wherein the solubilized portion of the latex copolymer exhibits a weight average molecular weight of less than about 230,000 g/mol, wherein the latex copolymer exhibits a glass transition temperature of between about −50° C., and about −15° C., and wherein a coating formed from the latex emulsion exhibits a wet adhesion to a thermoplastic polyolefin roofing membrane of greater than about 1 pound per linear inch when tested using fabric embedded peel adhesion testing per ASTM D903 at a coverage of about 80 ft$^2$/gallon.

18. The method of claim 17, wherein the vinyl monomer comprises butyl methacrylate, ethylhexyl methacrylate, a vinyl ester of neodecanoic acid, or combinations thereof.

19. The method of claim 18, wherein the butyl methacrylate, ethylhexyl methacrylate, the vinyl ester of neodecanoic acid, or combinations thereof comprises n-butyl methacrylate or a mixture of n-butyl methacrylate and ethylhexyl methacrylate.

* * * * *